Figure 1:
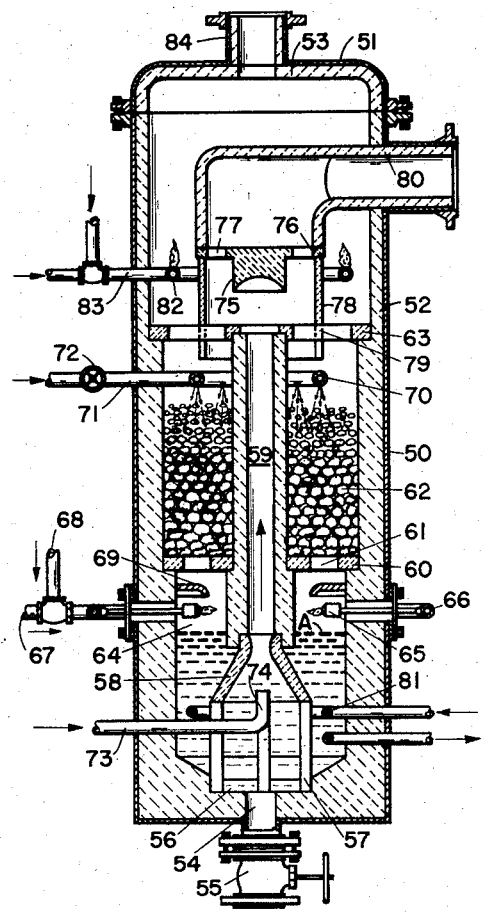

July 7, 1959  R. L. MAGOVERN ET AL  2,893,359
APPARATUS FOR VAPORIZING LIQUIDS
Filed Jan. 28, 1957

INVENTORS:
ROBERT L. MAGOVERN
HAROLD C. RIES
BY: Oswald H. Milmore
THEIR ATTORNEY United States Patent Office 2,893,359
Patented July 7, 1959

2,893,359
APPARATUS FOR VAPORIZING LIQUIDS

Robert L. Magovern, El Cerrito, and Harold C. Ries, Berkeley, Calif., assignors to Shell Development Company, New York, N.Y., a corporation of Delaware Application January 28, 1957, Serial No. 636,637

2 Claims. (Cl. 122—28)

This invention relates to the vaporization of liquids and finds especial utility in the vaporization of aggressive or corrosive materials such as halogens and metal halides, which are highly corrosive when in the liquid state. Such materials in some cases are less corrosive or substantially non-corrosive after vaporization, either without dilution or after dilution with other gases. A specific example is iodine, which occurs industrially in the solid state together with small amounts of moisture and/or hydrogen iodide and is highly corrosive when in the molten state, during vaporization, but which is somewhat less corrosive after vaporization. The invention is, however, also applicable to the vaporization of other substances which are liquid (or liquefied).

The vaporization of such liquids presents technological difficulties arising from the need to supply heat to the liquid under highly corrosive conditions, which are aggravated by the elevated temperatures involved. Extended surfaces are usually desirable to spread the liquid and expose a larger liquid area to the heat source. Walls providing heat exchange surfaces, however, deteriorate rapidly when made of materials having good heat conductivity and available at reasonable cost; stone or ceramic materials conduct heat too slowly to be useful in such applications.

It is the object of this invention to provide an improved apparatus for vaporizing liquids which are simple in operation and avoid the above-noted difficulties of corrosion without extensive recourse to noble metals such as platinum and tantalum while also obviating the operating difficulties of submerged combustion.

In summary, in accordance with the invention liquid is supplied to a pool beneath the level of a porous bed of refractory bodies, such as stones, bricks, or ceramic chips, through which hot gaseous combustion products are passed, preferably upwardly elevated by a gas to the upper part of the bed and, after disengagement from the lift gas, flowed through the said porous bed downwards and in countercurrent to the combustion products, the liquid being spread over the extended surfaces of the said bodies and thereby rapidly heated to vaporizing temperature by direct heat exchange with the combustion gases and, in part, by absorbing heat from the bodies themselves which are heated by the gases. In this manner it is possible to provide extended contacting surfaces of low-cost, refractory material and the liquid is subdivided into thin streams which are rapidly vaporized in whole or in part.

The rate of liquid flow can be controlled so that all is vaporized within the bed and withdrawn from the top of the bed in the form of vapor with the combustion gases, and substantially none drains down from the underside, which operates dry; this is the preferred arrangement when a rapid vaporization and a short exposure of the liquid to the hot gases is desired and also is indicated when the simplest type of installation is desired. However, according to an alternative method, the liquid is supplied to the porous bed at a greater rate, such that only a part of it is vaporized during a single pass through the bed and discharged as vapor with the hot gases from the top and a residue is discharged at the bottom into the said pool and again entrained in the lift gas; this makes more efficient use of the bed and makes it possible to employ a smaller bed.

The apparatus comprises a housing, preferably vertical, made of or lined with refractory material such as stone, brick or ceramic and containing the porous bed, a liquid sump beneath the bed, a gas-lift device for elevating liquid from the sump to an upper part of the bed, and means for admitting the liquid to the sump or directly to an upper part of the bed, either over or into it, for trickle flow therethrough, additional means such as a burner, for supplying hot combustion gases to a lower part of the bed for upward flow through the bed to impart heat to the liquid and to the refractory bodies constituting the bed, and a duct for discharging the combined vapors from the liquid and the spent combustion gases from an upper part of the bed.

Figure 2:
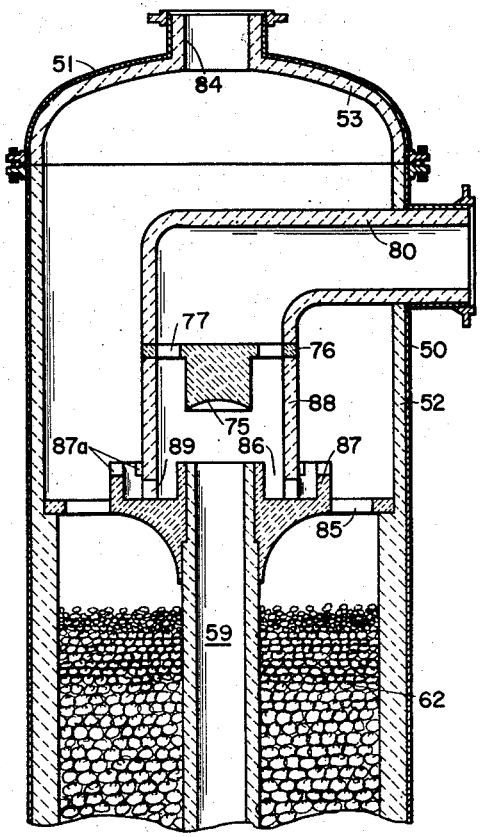

The invention will be described further in connection with the accompanying drawings forming a part of this specification and showing certain preferred embodiments thereof by way of illustration, wherein:

Figure 1 is a vertical sectional view through one form of apparatus according to the invention; and Figure 2 is a fragmentary view of a part of Figure 1 showing a variant thereof.

Referring to Figure 1, the vaporizer comprises a housing which includes an outer metallic shell 50 and head 51 lined with corrosion-resistant materials 52 and 53, respectively. The housing has a passage 54 which is normally closed by a cock 55 and receives liquid from a sump 56. Positioned by the edges of the sump are the legs 57 of a frusto-conical element 58 which supports a lift tube 59. An annular plate 60 having restricted passages 61 is positioned on shoulders formed on the lining 52 and lift tube 59 and defines the bottom of an annular vaporization chamber which is filled with refractory bodies 62 forming a porous bed. The top of the tube 59 is positioned by a spider 63. The combustion chamber 64, situated immediately beneath the plate 60, contains a plurality of burners 65 which are supplied with a combustible mixture via a header ring 66 from a gaseous fuel pipe 67 and a pipe 68 which supplies oxygen or air. Each burner is protected by a deflector plate 69 situated immediately above it for preventing descending liquid from extinguishing the flame. The liquid to be vaporized is distributed over the top of the bed by a perforated ring 70 connected to an inlet pipe 71 and valve 72.

A lift gas is admitted under suitable pressure to the bottom of the cone 58 through a supply pipe 73 and nozzle 74, which is directed along the axis of the lift tube 59. It will be understood that in this embodiment liquid is collected in the lower part of the housing approximately to the level A and that the lift gas entrains the liquid and carries it upwards through the tube 59. Any suitable disengagement device is provided above the tube 59, such as an impingement member 75 which may have a concave lower surface for deflecting liquid laterally and downwards. This deflector is provided with an integral ring 76 and radial arms 77, by which it is supported from a cylindrical tube or duct 78 which has slots 79 in the lower edge thereof for receiving the spokes of the spider 63. A discharge duct 80 communicates with the space within the duct 78.

The vaporizer may optionally be provided with a heating coil 81 made of corrosion-resistant material, such as tantalum, for the purpose of melting deposits should liquid accumulated in the lower part of the housing solidify therein. Also, an after-burner installation, including a perforated ring 82 above the bed, may be mounted outside of the duct 78 and supplied with a combustible mixture by a pipe 83. The head 51 has a discharge nozzle 84.

It may be noted that the several parts, which come into contact with the liquid and its vapor, such as the tube 59, cone 58, pipes 73, plates 69, etc., are made of suitable corrosion-resistant material, such as acid-resistant brick or stone or monolithically cast stoneware, which is inert toward the liquid to be vaporized and able to withstand moderately elevated to high temperature incident to combustion; ceramics such as silicon carbide and fused kaolin are suitable in the case of liquids such as iodine.

In operation, the liquid to be vaporized is supplied through the pipe 71 and distributed by the ring 70 over the top of the bed 62 and flows by gravity over the surfaces of the refractory bodies thereof. Combustion of the combustible mixture emitted from the burners 65 within the combustion zone 64 generates hot gases which flow upwards through the restricted passages 61 and thence through the interstices of the porous bed, thereby heating the refractory bodies and also coming into direct contact with the descending liquid. The liquid becomes heated by direct heat exchange with the ascending gases and also by coming into contact with the heated refractory bodies and is thereby vaporized. Rapid heating results because the bed causes the liquid to be spread out, so that large areas of the liquid are exposed. The vaporized liquid and partially cooled combustion gases together leave the top of the bed, flow mainly on the outside of the duct 78, and are withdrawn through the nozzle 84. The after-burner 82, when provided, supplies superheat to these vapors.

The rate of liquid admission is controlled by the valve 72. In one mode of operation the admission rate is such that some liquid reaches the bottom of the bed and is discharged at the bottom thereof through the passages 61 into the lower part of the housing. The admission rate is not, however, so high as to cause flooding within the bed. In other words, there is always an ample path for the upward flow of gas without requiring the gas to bubble through the liquid; instead, the liquid descends through the bed mainly by trickle or film flow along the bodies. The after-burner 82, when provided, supplies superheat to these vapors. Liquid which collects at the bottom of the housing is entrained by lift gas which is admitted through pipe 73 and nozzle 74, and is carried upwards through the lift tube 59. Upon striking the deflector 75 the liquid is, for the most part, disengaged from the gas and falls back on to the porous bed. The lift gas, together with a minor fraction of the combustion gases and vapors from the liquid, is withdrawn through the ducts 78 and 80.

Referring to Figure 2, there is shown a modification of parts of the upper portion of the apparatus of Figure 1, the other parts bearing reference numbers previously described being the same. The spider 63 is replaced by a spider 85 providing an annular trough 86 bounded by a weir 87, which may have serrations 87a. The duct 78 is replaced by a duct 88 which is supported by the spider 85 and has openings 89 at the bottom by which liquid can flow radially outwards; these openings are situated entirely below the level of the weir 87. The liquid distributor ring 70 and/or the after-burner 82 may be omitted and are, therefore, not shown in this view.

In operation, liquid to be vaporized is admitted to the bottom of the housing, e.g., through the cock 55 and passage 54, and is raised from the resulting pool through the lift tube 59 by entrainment in a lift gas. Upon striking the impingement member 75 the liquid is disentrained and falls into the trough 86 while the lift gas is withdrawn through the duct 80. The liquid passes outwards through the openings 89 and overflows the weir 87. The serrations 87a assist in uniform distribution of liquid about the periphery and, hence, distribution of the liquid over the porous bed 62, through which it descends by gravity and wherein it is vaporized by the hot combustion gases as previously described. The rate of flow of lift gas may be regulated so that liquid is admitted to the bed 62 at the vaporization rate (whereby no liquid returns to the pool at the bottom) or at a higher rate, with return flow.

In the arrangement of Figure 2 the trough 86, with the weir 87 and duct 88, forms a liquid seal which prevents the entry of vaporized liquid and combustion gases into the ducts 88 and 80. Hence substantially only lift gas (which may contain some vapors from the liquid) are discharged through the latter duct while the spent combustion gas and the vapors from the liquid are discharged through the nozzle 84.

The porous beds in each of the embodiments disclosed are advantageously composed of bodies which provide extended surfaces, such as 5 or more square feet per cubic foot, and provide porous spaces of dimensions greater than capillary, i.e., such that liquid will descend without forming stable films through which the ascending gases must flow. Suitable free volumes are from 30 to 80 percent of the total.

We claim as our invention:

1. Apparatus for vaporizing corrosive liquid comprising: a housing defining an upright flow passage; means for admitting corrosive liquid to be vaporized into said housing; a porous bed of corrosion-resistant bodies within said housing; said housing including walls forming a combustion chamber in direct communication with a lower part of said bed; a burner within said combustion chamber; said housing further including walls forming a liquid-collecting basin beneath the said bed; a lift tube rising from said basin through the bed; means for supplying a lift gas to the bottom of said lift tube for upward flow therethrough, the bottom of said lift tube being situated in relation to said basin so that liquid in the latter is entrained by the lift gas; means at the top of the lift tube for separating the entrained liquid from the lift gas and supplying the separated liquid to the upper part of the bed for trickle flow through at least a part thereof; means for discharging the lift gas substantially freed from liquid; and separate outlet means above said bed for discharging vapors of said liquid together with combustion gases rising from the bed, the said housing, basin and lift tube being formed of corrosion-resistant material.

2. Apparatus according to claim 1 wherein the said means for discharging the lift gas comprises an upwardly directed discharge duct, and a trough surrounding the lift tube adapted to contain liquid, the bottom of said duct being positioned for immersion in said trough to form a liquid seal and providing a flow passage for the outward flow of liquid.

References Cited in the file of this patent

UNITED STATES PATENTS

| | | |
|---|---|---|
| 810,486 | Harrison | Jan. 23, 1906 |
| 2,677,601 | Ruth | May 4, 1954 |